US 9,735,693 B2

(12) United States Patent
Shein

(10) Patent No.: US 9,735,693 B2
(45) Date of Patent: Aug. 15, 2017

(54) POWER CONVERSION APPARATUS WITH POWER SAVING AND HIGH CONVERSION EFFICIENCY MECHANISMS

(71) Applicant: Power Forest Technology Corporation, Hsinchu County (TW)

(72) Inventor: Chein-Kuo Shein, Taipei (TW)

(73) Assignee: Power Forest Technology Corporation, Hsinchu County (TW)

( * ) Notice: Subject to any disclaimer, the term of this patent is extended or adjusted under 35 U.S.C. 154(b) by 0 days.

(21) Appl. No.: 14/689,041

(22) Filed: Apr. 16, 2015

(65) Prior Publication Data

US 2016/0190947 A1   Jun. 30, 2016

(30) Foreign Application Priority Data

Dec. 31, 2014  (TW) .............................. 103146541 A

(51) Int. Cl.
*H02M 3/335* (2006.01)
*H02M 1/00* (2006.01)

(52) U.S. Cl.
CPC ............ *H02M 3/33592* (2013.01); *H02M 2001/0032* (2013.01); *H02M 2001/0054* (2013.01); *Y02B 70/1475* (2013.01); *Y02B 70/1491* (2013.01); *Y02B 70/16* (2013.01)

(58) Field of Classification Search
CPC ......... H02M 3/33507; H02M 3/33515; H02M 3/33576; H02M 3/33592
USPC ........................................... 363/21.12–21.14
See application file for complete search history.

(56) References Cited

U.S. PATENT DOCUMENTS

| 6,091,234 A | 7/2000 | Kitagawa | |
| 7,688,602 B2* | 3/2010 | Hu | H02M 1/08 363/21.14 |
| 8,040,698 B2* | 10/2011 | Hyuugaji | H02M 3/33592 363/21.14 |
| 8,411,470 B2 | 4/2013 | Sato | |

(Continued)

FOREIGN PATENT DOCUMENTS

TW    201143292    12/2011

OTHER PUBLICATIONS

"Office Action of Taiwan Counterpart Application", issued on Jan. 5, 2016, p. 1-p. 6, in which the listed references were cited.

*Primary Examiner* — Timothy J Dole
*Assistant Examiner* — Sisay G Tiku
(74) *Attorney, Agent, or Firm* — Jianq Chyun IP Office

(57) ABSTRACT

A power conversion apparatus is provided. The power conversion apparatus includes a transformer, a synchronous rectification (SR) transistor and an SR control circuit. A first terminal of a primary side of the transformer receives an input voltage. A first terminal of a secondary side of the transformer provides an output voltage to a load. A first drain/source terminal of the SR transistor is coupled to a second terminal of the secondary side of the transformer. A second drain/source terminal of the SR transistor is coupled to a first ground terminal. A gate terminal of the SR transistor receives a control signal. The SR control circuit receives a signal of the first drain/source terminal of the SR transistor to determine statuses of the load and generate the control signal. When the load is a light load, the SR control circuit enters a power-saving mode and turns off the SR transistor.

15 Claims, 5 Drawing Sheets

(56) References Cited

U.S. PATENT DOCUMENTS

| | | | |
|---|---|---|---|
| 2006/0255782 A1 | 11/2006 | Sugiyama et al. | |
| 2007/0201253 A1* | 8/2007 | Endo | H02M 7/217 363/127 |
| 2009/0015228 A1* | 1/2009 | Sato | H02M 3/33523 323/283 |
| 2009/0109711 A1* | 4/2009 | Hsu | H02M 3/33592 363/21.14 |
| 2009/0213623 A1* | 8/2009 | Yang | H02M 3/33507 363/49 |
| 2009/0231895 A1* | 9/2009 | Hu | H02M 3/33592 363/127 |
| 2009/0284995 A1* | 11/2009 | Sato | G01R 19/0084 363/21.14 |
| 2009/0316441 A1* | 12/2009 | Hu | H02M 3/33592 363/21.06 |
| 2010/0027298 A1* | 2/2010 | Cohen | H02M 3/33592 363/21.14 |
| 2010/0182806 A1* | 7/2010 | Garrity | H02M 3/33569 363/21.14 |
| 2010/0270862 A1 | 10/2010 | Miyanaga et al. | |
| 2013/0235620 A1* | 9/2013 | Morris | H02M 3/335 363/21.12 |
| 2014/0003097 A1* | 1/2014 | Sakurai | H02M 3/33507 363/21.14 |
| 2016/0181934 A1* | 6/2016 | Kikuchi | H02M 3/33523 363/21.14 |

* cited by examiner

POWER CONVERSION APPARATUS WITH POWER SAVING AND HIGH CONVERSION EFFICIENCY MECHANISMS

CROSS-REFERENCE TO RELATED APPLICATION

This application claims the priority benefit of Taiwan application serial no. 103146541, filed on Dec. 31, 2014. The entirety of the above-mentioned patent application is hereby incorporated by reference herein and made a part of this specification.

BACKGROUND

Field of the Invention

The invention is directed to a power conversion technique and more particularly, to a power conversion apparatus with power saving capability and high conversion efficiency.

Description of Related Art

Power conversion apparatuses are indispensable parts of electronic apparatuses at present. In a power conversion apparatus controlled based on pulse width modulation (PWM), a secondary side thereof typically includes a rectification diode. Due to the rectification diode in an on state having greater power consumption, a synchronous rectification (SR) transistor with a lower turned on resistance (Rds-on) is adopted in replacement with the rectification diode. Under such architecture, an SR controller is further needed to control the turning on and turning off of the SR transistor at the secondary side.

Generally, a parasitic capacitor is between a gate terminal and a source terminal of the SR transistor. When the SR transistor is switched between on and off states, the SR controller has to charge or discharge the parasitic capacitor, such that power consumption occurs. Besides, the SR transistor itself also consumes power. When a load of the power conversion apparatus is in a light load status, the power consumption causes reduction to conversion efficiency of the power conversion apparatus, which is unfavorable for power saving. Therefore, how to improve the overall conversion efficiency of the power conversion apparatus effectively becomes an important subject to the power conversion technology related field.

SUMMARY

Accordingly, the invention provides a power conversion apparatus with a power saving and high conversion efficiency mechanism for resolving the issues occurring in the related art.

The invention is directed to a power conversion apparatus, including a transformer, a synchronous rectification (SR) transistor and an SR control circuit. The transformer has a primary side and a secondary side. A first terminal of the primary side is configured to receive an input voltage, and a first terminal of the secondary side is configured to provide an output voltage to a load. A first drain/source terminal of the SR transistor is coupled to a second terminal of the secondary side, a second drain/source terminal of the SR transistor is coupled to a first ground terminal, and a gate terminal of the SR transistor is configured to receive a control signal. The SR control circuit is coupled to the SR transistor and receives a signal from the first drain/source terminal of the SR transistor to serve the signal as a detection signal. The SR control circuit determines a status of the load according to the detection signal, so as to generate the control signal.

In an embodiment of the invention, in the power conversion apparatus, when determining that the load is in a light load status, the SR control circuit enters a power-saving mode, and the SR transistor is controlled by the control signal and turned off. When determining that the load is in a moderate or heavy load status, the SR control circuit enters a normal operation mode, and the SR transistor is controlled by the control signal and turned on or turned off.

In an embodiment of the invention, a parasitic diode is between the first drain/source terminal and a body terminal of the SR transistor. The SR control circuit calculates a time interval of the detection signal and determines the status of the load according to a length of the time interval, so as to generate the control signal. The time interval is a duration of the SR transistor or the parasitic diode being turned on.

In an embodiment of the invention, the SR control circuit includes a timing circuit, a decision circuit and a driving circuit. The timing circuit receives the detection signal to calculate the time interval and generates a first signal related to the time interval. The decision circuit is coupled to the timing circuit to receive the first signal. The decision circuit determines whether the first signal is less than a first threshold. If the determination result is yes, the decision circuit accumulates a first count or else resets the first count. When the first count is greater than or equal to a first preset value, the decision circuit determines that the load is in the light load status and generates a mode signal, such that the SR control circuit is operated in the power-saving mode. The driving circuit is coupled to the decision circuit to receive the mode signal and generates the control signal to turn off the SR transistor when the mode signal indicates that the SR control circuit is operated in the power-saving mode.

In an embodiment of the invention, the decision circuit determines whether the first signal is greater than or equal to the first threshold. If the determination result is yes, the decision circuit accumulates a second count or else resets the second count. When the second count is greater than or equal to a second preset value, the decision circuit determines that the load is in the moderate or heavy load status and generates the mode signal, such that the SR control circuit is operated in the normal operation mode. The driving circuit further receives the detection signal. When the mode signal indicates that the SR control circuit is operated in the normal operation mode, the driving circuit turns on the SR transistor as a voltage level of the detection signal is smaller than a first reference voltage level and turns off the SR transistor as the voltage level of the detection signal is greater than a second reference voltage level.

In an embodiment of the invention, the decision circuit includes a decision comparator, a counter and an SR flip-flop. A non-inverting input terminal of the decision comparator is coupled to the timing circuit to receive the first signal. An inverting input terminal of the decision comparator receives the first threshold. The decision comparator compares the first signal with the first threshold and generates the decision signal. The counter is coupled to the decision comparator to receive the decision signal. When the decision signal indicates that the first signal is less than the first threshold, the counter accumulates the first count and resets the second count, or else the counter resets the first count and accumulates the second count. When the first count is greater than or equal to the first preset value, the counter generates a setting signal. When the second count is greater than or equal to the second preset value, the counter generates a reset signal. A setting terminal of the SR flip-flop is coupled to the counter to receive the setting signal. A reset terminal of the SR flip-flop is coupled to the counter to receive the reset signal. A non-inverting output terminal of the SR flip-flop outputs the mode signal.

In an embodiment of the invention, the timing circuit includes a first comparator, a second comparator, an SR flip-flop, a discharge switch, a current source and a capacitor. An inverting input terminal of the first comparator receives the detection signal, and a non-inverting input terminal of the first comparator receives the first reference voltage level to generate a first comparison signal. A non-inverting input terminal of the second comparator receives the detection signal, and an inverting input terminal of the second comparator receives the second reference voltage level to generate a second comparison signal. A setting terminal of the SR flip-flop is coupled to the first comparator to receive the first comparison signal, a reset terminal of the SR flip-flop is coupled to the second comparator to receive the second comparison signal, and a non-inverting output terminal of the SR flip-flop outputs a second signal. A control terminal of the discharge switch is coupled to the inverting output terminal of the SR flip-flop to receive an inverted second signal, and a second terminal of the discharge switch is coupled to the first ground terminal. A first terminal of the current source is coupled to a power voltage, and a second terminal of the current source is coupled to a first terminal of the discharge switch. A first terminal of the capacitor is coupled to a second terminal of the current source to generate the first signal, and a second terminal of the capacitor is coupled to the first ground terminal.

In an embodiment of the invention, the SR control circuit calculates a cycle time of the detection signal and determines the status of the load according to a length of the cycle time, so as to generate the control signal. The cycle time is an energy conversion cycle of the power conversion apparatus.

In an embodiment of the invention, the SR control circuit includes a timing circuit, a decision circuit and a driving circuit. The timing circuit receives the detection signal to calculate the cycle time and generate a first signal related to the cycle time. The decision circuit is coupled to the timing circuit to receive the first signal. The decision circuit determines whether the first signal is greater than the first threshold. If the determination result is yes, the decision circuit determines that the load is in the light load status and generates a mode signal, such that the SR control circuit is operated in the power-saving mode. The driving circuit is coupled to the decision circuit to receive the mode signal. When the mode signal indicates that the SR control circuit is operated in the power-saving mode, the driving circuit generates the control signal to turn off the SR transistor.

In an embodiment of the invention, the decision circuit determines whether the first signal is less than or equal to the first threshold. If the determination result is yes, the decision circuit accumulates a first count or else resets the first count. If the first count is greater than or equal to a first preset value, the decision circuit determines that the load is in the moderate or heavy load and generates the mode signal, such that the SR control circuit is operated in the normal operation mode. The driving circuit further receives the detection signal. When the mode signal indicates that the SR control circuit is operated in the normal operation mode, the driving circuit turns on the SR transistor as a voltage level of the detection signal is smaller than a first reference voltage level and turns off the SR transistor as the voltage level of the detection signal is greater than a second reference voltage level.

In an embodiment of the invention, the decision circuit includes a comparator, a counter and an SR flip-flop. A non-inverting input terminal of the comparator is coupled to the timing circuit to receive the first signal, an inverting input terminal of the comparator receives the first threshold, and the comparator compares the first signal with the first threshold to generate a comparison signal. The counter receives the detection signal and is coupled to the comparator to receive the comparison signal. If the comparison signal indicates that the first signal is less than or equal to the first threshold at the end of the cycle time of the detection signal, the counter accumulates the first count or else resets the first count. When the first count is greater than or equal to the first preset value, the counter generates a reset signal. A setting terminal of the SR flip-flop is coupled to the comparator to receive the comparison signal, a reset terminal of the SR flip-flop is coupled to the counter to receive the reset signal, and a non-inverting output terminal of the SR flip-flop output the mode signal.

In an embodiment of the invention, the timing circuit includes a one-shot circuit, a discharge switch, current source and a capacitor. The one-shot circuit receives the detection signal and is configured to detect an edge of the detection signal to generate a trigger signal. A control terminal of the discharge switch is coupled to the one-shot circuit to receive the trigger signal, and a second terminal of the discharge switch is coupled to the first ground terminal. A first terminal of the current source is coupled to a power voltage, a second terminal of the current source is coupled to a first terminal of the discharge switch. A first terminal of the capacitor is coupled to the second terminal of the current source to generate the first signal, and a second terminal of the capacitor is coupled to the first ground terminal.

In an embodiment of the invention, the power conversion apparatus further includes a power switch and a pulse width modulation signal generator. A first terminal of the power switch is coupled to the second terminal of the primary side, a second terminal of the power switch is coupled to a second ground terminal, and a control terminal of the power switch is configured to receive a pulse width modulation signal. The pulse width modulation signal generator is coupled to the control terminal of the power switch and configured to adjust the pulse width modulation signal according to the status of the load wherein a parasitic diode is between the first drain/source terminal and a body terminal of the SR transistor. When the power switch is turned off, and the SR control circuit is operated in the power-saving mode, the SR transistor is controlled by the control signal and turned off, and the parasitic diode is turned on.

In an embodiment of the invention, when the power switch is turned off, and the SR control circuit is operated in the normal operation mode, the SR transistor is controlled by the control signal and turned on.

In an embodiment of the invention, when the power switch is turned on, the SR transistor and the parasitic diode are turned off.

Based on the above, in the power conversion apparatus provided by the embodiments of the invention, the SR control circuit can detect the time interval of the SR transistor (or the parasitic diode thereof) being turned on or the cycle time of the power conversion of the power conversion apparatus according to the signal from the first drain/source terminal of the SR transistor, so as to determine the status change of the load. When determining that the load is in the light load status, the SR control circuit can enter the power-saving mode and turn off the SR transistor. Thereby, power consumption caused by the SR control circuit charging/discharging the parasitic capacitor of the SR transistor during the SR transistor being switched between on and off states can be prevented. Besides, in the power-saving mode, the SR control circuit can also turn off the related circuits serving for driving the SR transistor to achieve power saving, such that the power conversion efficiency in the light load status can be improved.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
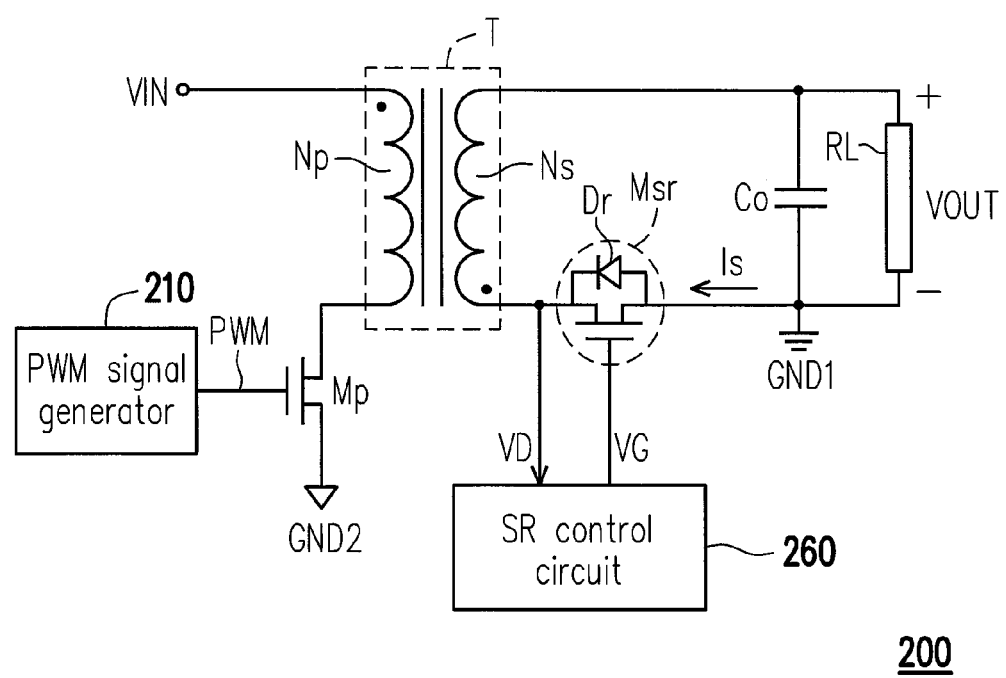
FIG. 1 is a schematic circuit diagram illustrating a power conversion apparatus according to an embodiment of the invention.

In order to make the disclosure more comprehensible, embodiments are described below as examples showing that the disclosure can actually be realized. Wherever possible, the same reference numbers are used in the drawings and the description to refer to the same or like parts.

FIG. 1 is a schematic circuit diagram illustrating a power conversion apparatus 200 according to an embodiment of the invention. Referring to FIG. 1, the power conversion apparatus 200 includes a transformer T, a synchronous rectification (SR) transistor Msr, an SR control circuit 260, a power switch Mp and a pulse width modulation (PWM) signal generator 210. The transformer T includes a primary side Np and a secondary side Ns. A first terminal (e.g., a common-polarity terminal, which is a dotted terminal) of the primary side Np is configured to receive an input voltage VIN, and a first terminal (e.g., an opposite-polarity terminal, which is a non-dotted terminal) of the secondary side Ns is configured to provide an output voltage VOUT to a load RL (e.g., an electronic apparatus), but the invention is not limited thereto.

A first drain/source terminal of the SR transistor Msr is coupled to a second terminal (e.g., a common-polarity terminal) of the secondary side Ns, a second drain/source terminal of the SR transistor Msr is coupled to a first ground terminal GND1, and a gate terminal of the SR transistor Msr is configured to receive a control signal VG. The SR control circuit 260 is coupled to the SR transistor Msr and receives a signal from the first drain/source terminal of the SR transistor Msr to serve the signal as a detection signal VD. The SR control circuit 260 determines a status of the load RL according to the detection signal VD, so as to generate the control signal VG. A parasitic diode Dr is between the first drain/source terminal and a body terminal of the SR transistor Msr.

On the other hand, a first terminal of the power switch Mp is coupled to a second terminal (e.g., an opposite-polarity terminal) of the primary side Np, a second terminal of the power switch Mp is coupled to a second ground terminal GND2, and a control terminal of the power switch Mp is configured to receive a pulse width modulation signal PWM. The PWM signal generator 210 is coupled to the control terminal of the power switch Mp and configured to generate and adjust the pulse width modulation signal PWM according to the status of the load RL (or a power supplying requirement).

Figure 2:
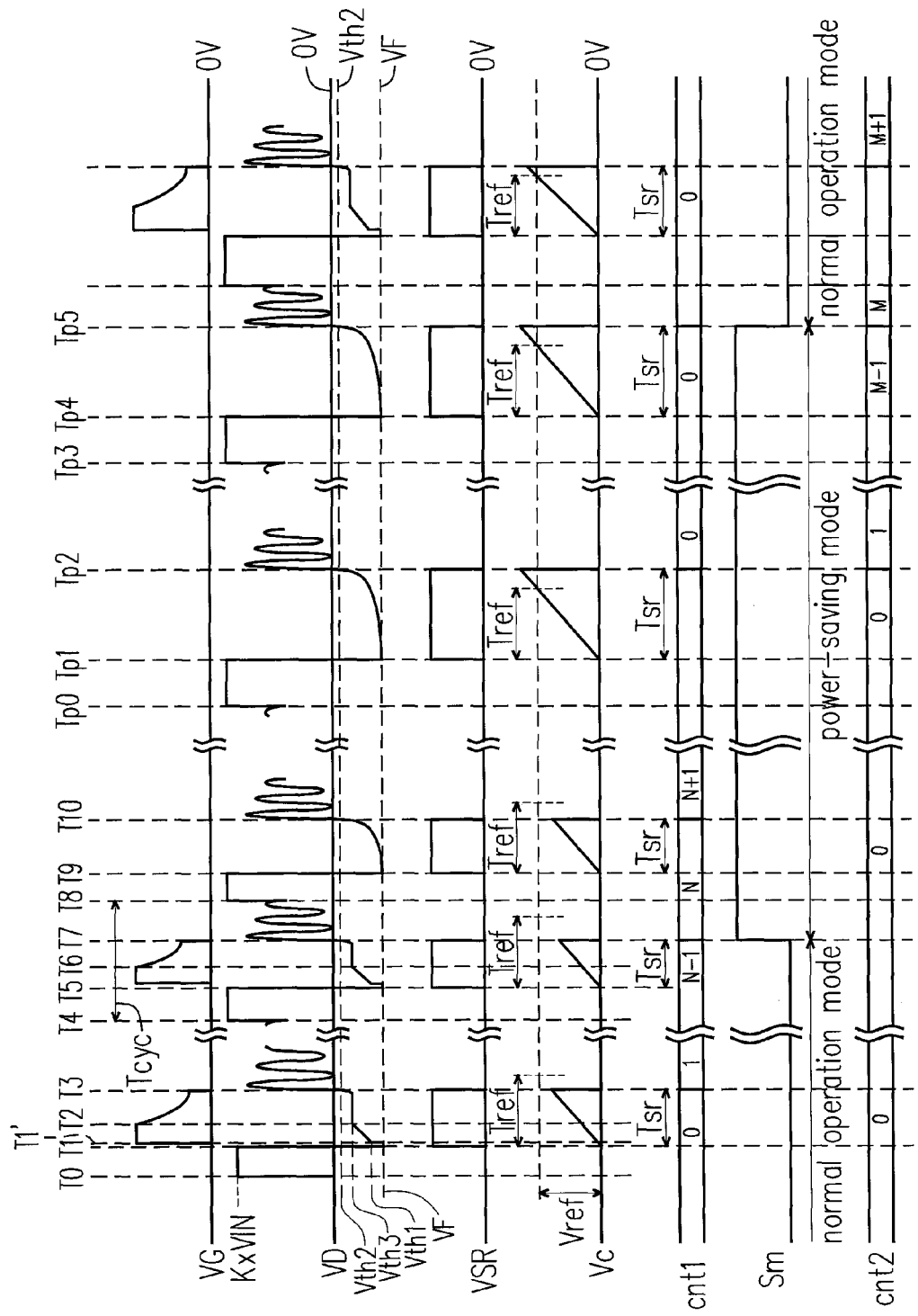
FIG. 2 is a timing diagram of signals in the power conversion apparatus depicted in FIG. 1 and the SR control circuit depicted in FIG. 3.

The operation of the power conversion apparatus 200 will be described in detail below. Referring to FIG. 1 and FIG. 2, FIG. 2 is a timing diagram of signals in the power conversion apparatus 200 and the SR control circuit 260. Among them, signals in the SR control circuit 260 will be described with reference to another diagram later. At a time T0, the power switch Mp is turned on, the input voltage VIN provides power to the coil of the primary side Np of the transformer T for energy storage. In the meantime, the SR transistor Msr and the parasitic diode Dr are in an off state. Thus, a voltage level of the detection signal VD is expressed by K×VIN, where K is a ratio of the coil of the secondary side Ns to the coil of the primary side Np in the transformer T.

At a time T1, the power switch Mp is turned off in response to the pulse width modulation signal PWM generated by the PWM signal generator 210. Based on the Lenz's law, the energy stored by the primary side Np of the transformer T is transferred to the secondary side Ns of the transformer T. In the meantime, the parasitic diode Dr in the SR transistor Msr is subject to forward bias and turned on. Due to the body terminal of the SR transistor Msr being coupled to the first ground terminal GND1, a voltage level of the first drain/source terminal of the SR transistor Msr (i.e., the voltage level of the detection signal VD) is reduced from K×VIN down to a negative voltage level VF.

When detecting that the voltage level of the detection signal VD (i.e., the negative voltage level VF) is less than a first reference voltage level Vth1 (e.g., −200 mV, but the invention is not limited thereto), the SR control circuit 260 may turn on the SR transistor Msr, as shown from the time T1 to a time T1'. In this case, the energy transferred to the secondary side Ns of the transformer T starts to charge a capacitor Co and provide the DC output voltage VOUT to the load RL. Thus, a current Is of the secondary side Ns of the transformer T flows from the second drain/source terminal of the SR transistor Msr through an internal sensing channel of the SR transistor Msr to the first drain/source terminal of the SR transistor Msr.

With the capacitor Co being charged continuously by the stored energy, the current Is of the secondary side Ns is continuously lowered down, such that the voltage level of the detection signal VD is pulled up from the negative voltage level VF, until the voltage level of the detection signal VD reaches a third reference voltage level Vth3 (e.g., −70 mV, but the invention is not limited thereto), as presented at a time T2. In this circumstance, the SR control circuit 260 starts to reduce a voltage level of the control signal VG to maintain the voltage level of the detection signal VD at the third reference voltage level Vth3. The current Is of the secondary side Ns is still reduced continuously, which leads the SR control circuit 260 to be incapable of maintaining the voltage level of the detection signal VD at the third reference voltage level Vth3, and the voltage level of the detection signal VD raises up to a second reference voltage level Vth2 (e.g., −30 mV, but the invention is not limited thereto), as presented at a time T3. In this circumstance, the energy stored by the transformer T is completely transferred to the capacitor Co, thus, the current Is of the secondary side Ns is reduced down to 0, and the SR control circuit 260 turns off the SR transistor Msr. Therein, a time interval Tsr from the time T1 to the time T3 is a duration of the SR transistor Msr being turned on. Alternatively, the time interval Tsr may also be considered a duration of the capacitor Co being charged by the energy stored in the transformer T.

At the time T3, both the power switch Mp and the SR transistor Msr are in the off state. Since the transference of the energy stored in the transformer T is completed, the coil of the primary side Np, a parasitic capacitor of the power switch Mp, and an inductor in the primary side Np starts to generate resonance, until the power switch Mp is again turned on, the input voltage VIN again provides power to the coil of the primary side Np of the transformer T for energy storage and then repeats operations similar to those performed between the time T0 and a time T4, for example, during a time interval between a time T4 and a time T8.

As described above, the PWM signal generator 210 may generate and adjust the pulse width modulation signal PWM according to the status of the load RL (or the power supplying requirement). When the load RL is in a light load status, which leads the power supplying requirement to be reduced, the PWM signal generator 210 may reduce a duty cycle of the pulse width modulation signal PWM. In this way, a duration (e.g., between the time T0 and the time T1) of the power switch Mp being turned on in response to the pulse width modulation signal PWM generated by the PWM signal generator 210 becomes shorter, such that the energy stored by the transformer T each time becomes less and less. In this circumstance, the energy transferred by the transformer T each time is reduced with the reduction of the stored energy. Thus, the duration (i.e., the time interval Tsr) of the capacitor Co being charged is also reduced. In other words, the duration of the SR transistor Msr being turned on is reduced, and vice versa.

Since the time interval Tsr of the detection signal VD is the duration of the SR transistor Msr being turned on, in an embodiment of the invention, the SR control circuit 260 may calculate the time interval Tsr of the detection signal VD and determine the status of the load RL (e.g., in the light load status or a moderate or heavy load status) according to a length of the time interval Tsr, so as to generate the control signal VG.

For example, when the SR control circuit 260 determines the load RL as being in the light load state according to the time interval Tsr, the SR control circuit 260 may enter the power-saving mode and generate the control signal VG to turn off the SR transistor Msr. In this circumstance, the current Is of the secondary side Ns flows through the parasitic diode Dr in the SR transistor Msr. In this way, power consumption caused by the SR control circuit 260 charging/discharging the parasitic capacitor Cgs of the SR transistor Msr during the SR transistor Msr being switched between on and off states may be prevented. In addition, in the power-saving mode, the SR control circuit 260 may turn off the related circuits for driving control signal VG to achieve the purpose of power saving, such that the power conversion efficiency in the light load status may be improved.

Figure 3:
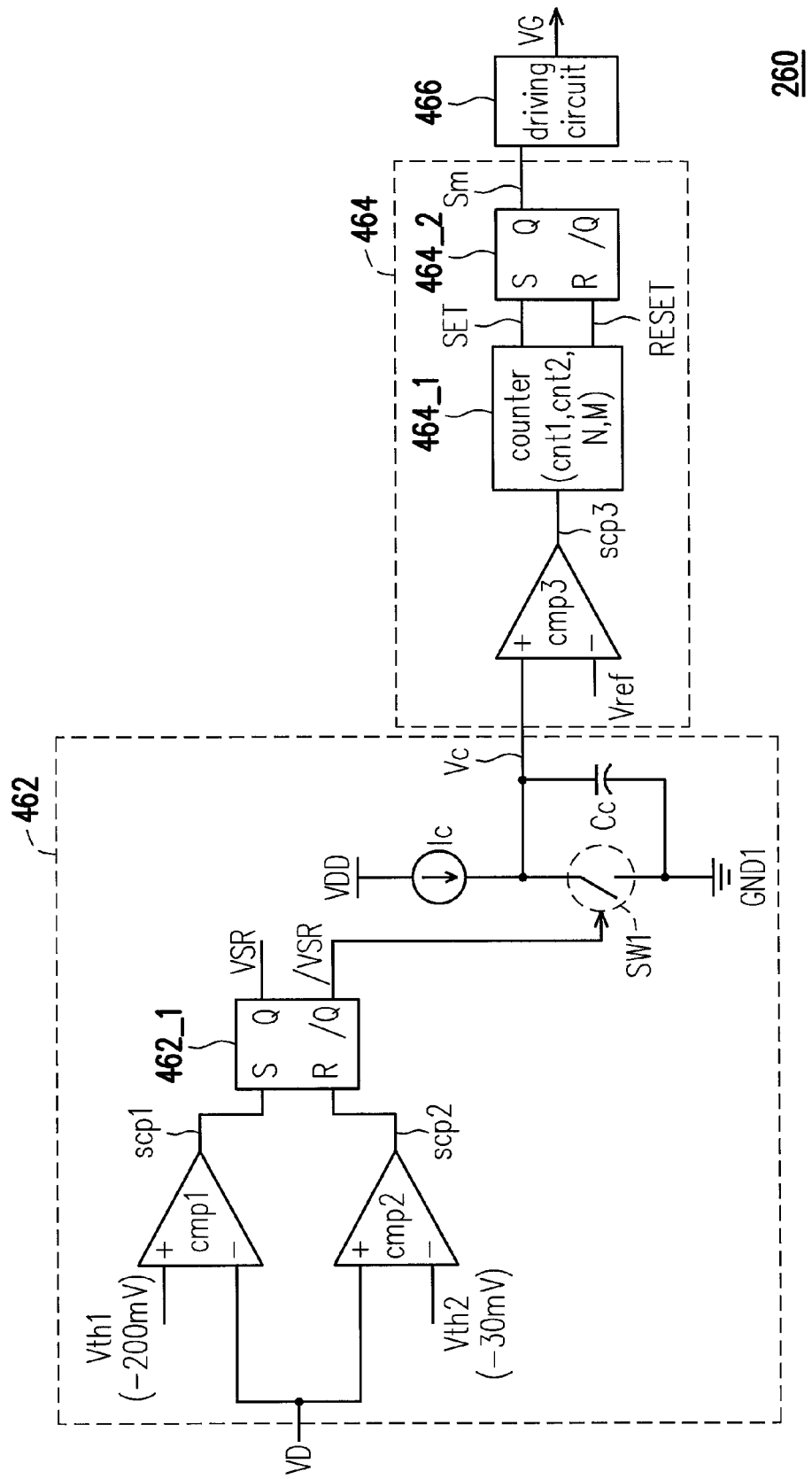
FIG. 3 is a schematic circuit diagram illustrating the SR control circuit of the power conversion apparatus depicted in FIG. 1 according to an embodiment of the invention.

Referring to FIG. 1, FIG. 2 and FIG. 3 simultaneously, FIG. 3 is a schematic circuit diagram illustrating the SR control circuit 260 of the power conversion apparatus 200 depicted in FIG. 1 according to an embodiment of the invention. The SR control circuit 260 includes a timing circuit 462, a decision circuit 464 and a driving circuit 466. The timing circuit 462 receives the detection signal VD to calculate the time interval Tsr and generates a first signal Vc related to the time interval Tsr.

The decision circuit 464 is coupled to the timing circuit 462 to receive the first signal Vc. The decision circuit 464 determines whether the first signal Vc is less than the first threshold Vref. If yes, the decision circuit 464 accumulates a first count cnt1 (e.g., at the times T3 and T7 in FIG. 2) or else resets the first count cnt1 (e.g., at a time Tp2 in FIG. 2). When the first count cnt1 is greater than or equal to the first preset value N, i.e., a time length of each of N (where N is a positive integer) or more consecutive time intervals Tsr is smaller than a first threshold time Tref (e.g., at the time T7 in FIG. 2), the decision circuit 464 may determine that the load RL is in the light load status and generate a mode signal Sm, such that the SR control circuit 260 is operated in the power-saving mode. Therein, the first threshold time Tref is associated with the first threshold Vref.

The driving circuit 466 is coupled to the decision circuit 464 to receive the mode signal Sm. When the mode signal Sm indicates that the SR control circuit 260 is operated in the power-saving mode, the driving circuit 466 generates the control signal VG to turn off the SR transistor Msr.

For example, from a time T7 to a time Tp5 in FIG. 2, the SR control circuit 260 is operated in the power-saving mode. In this circumstance, the voltage level of the control signal VG is maintained at 0V to turn off the SR transistor Msr. At the time T8, the power switch Mp is turned on, the input voltage VIN provides power to the coil of the primary side Np of the transformer T for energy storage. At a time T9, the power switch Mp is turned off in response to the pulse width modulation signal PWM generated by the PWM signal generator 210. The energy stored in the primary side Np of the transformer T is transferred to the secondary side Ns of the transformer T. In the meantime, the parasitic diode Dr in the SR transistor Msr is subject to forward bias and turned on. Thus, the voltage level (i.e., the voltage level of the detection signal VD) of the first drain/source terminal of the SR transistor Msr is reduced from K×VIN down to the negative voltage level VF. In this circumstance, due to the SR transistor Msr being turned off, the current Is of the secondary side Ns flows through the parasitic diode Dr in the SR transistor Msr.

With the capacitor Co being charged continuously by the stored energy, the current Is of the secondary side Ns is continuously lowered down, such that the voltage level of the detection signal VD is pulled up from the negative voltage level VF, until the voltage level of the detection signal VD reaches the second reference voltage level Vth2 (e.g., −30 mV, but the invention is not limited thereto), as presented at a time T10. In this circumstance, the energy stored in the transformer T is completely transferred to the capacitor Co, thus, the current Is of the secondary side Ns is reduced down to 0, such that the parasitic diode Dr in the SR transistor Msr is turned off. Therein, a time interval Tsr from the time T9 to the time T10 is a duration of the parasitic diode Dr being turned on, i.e., the duration of the capacitor Co being charged by the energy stored in the transformer T. Thus, when the SR control circuit 260 is operated in the power-saving mode, the status of the load RL may still be determined by means of calculating the time interval Tsr of the detection signal VD and according to the length of the time interval Tsr, so as to generate the control signal VG.

On the other hand, when determining that the first signal Vc is greater than or equal to the first threshold Vref, the decision circuit 464 accumulates a second count cnt2 (e.g., at a time Tp2 and a time Tp5 in FIG. 2) or else resets the second count cnt2. When the second count cnt2 is greater than or equal to a second preset value M (e.g., at a time Tp5 in FIG. 2), i.e., a time length of each of M or more consecutive time intervals Tsr is greater than or equal to the first threshold time Tref, the decision circuit 464 may determine that the load RL is in the moderate or heavy load and generate the mode signal Sm, such that the SR control circuit 260 is operated in the normal operation mode.

For example, before the time T7 and after the time Tp5 in FIG. 2, the SR control circuit 260 is operated in the normal operation mode. Therein, the driving circuit 466 may receive the detection signal VD to control the turning on and off of the SR transistor Msr. When the mode signal Sm indicates that the SR control circuit 260 is operated in the normal operation mode, as described above, the driving circuit 466 turns on the SR transistor Msr as the voltage level of the detection signal VD is smaller than the first reference voltage level Vth1 (e.g., −200 mV, but the invention is not limited thereto) and turns off the SR transistor Msr as the voltage level of the detection signal VD is greater than the second reference voltage level Vth2 (e.g., −30 mV, but the invention is not limited thereto). Details related to the turning on and off of the SR transistor Msr may refer to the description with respect to the operation from the time T0 to the time T3 and will not be repeated hereinafter.

Referring to FIG. 3, in an embodiment of the invention, the decision circuit 464 may include a decision comparator cmp3, a counter 464_1 and an SR flip-flop 464_2. A non-inverting input terminal of the decision comparator cmp3 is coupled to the timing circuit 462 to receive the first signal Vc, an inverting input terminal of the decision comparator cmp3 receives the first threshold Vref. The decision comparator cmp3 compares the first signal Vc with the first threshold Vref and generates a decision signal scp3. The counter 464_1 is coupled to the decision comparator cmp3 to receive the decision signal scp3. When the decision signal scp3 indicates that the first signal Vc is less than the first threshold Vref, the counter 464_1 accumulates the first count cnt1 and resets the second count cnt2 or else resets the first count cnt1 and accumulates the second count cnt2. When the first count cnt1 is greater than or equal to a first preset value N (where N is a positive integer), the counter 464_1 generates a setting signal SET. When the second count cnt2 is greater than or equal to a second preset value M (where M is a positive integer), the counter 464_1 generates a reset signal RESET. A setting terminal S of the SR flip-flop 464_2 is coupled to the counter 464_1 to receive the setting signal SET, a reset terminal R of the SR flip-flop 464_2 is coupled to the counter 464_1 to receive the reset signal RESET, and a non-inverting output terminal Q of the SR flip-flop 464_2 outputs the mode signal Sm.

The implementation of the timing circuit 462 will be described hereinafter. Referring to FIG. 3, the timing circuit 462 includes a first comparator cmp1, a second comparator cmp2, an SR flip-flop 462_1, a discharge switch sw1, a current source Ic and a capacitor Cc. An inverting input terminal of the first comparator cmp1 receives the detection signal VD, a non-inverting input terminal of the first comparator cmp1 receives the first reference voltage level Vth1 (e.g., −200 mV, but the invention is not limited thereto) and generates a first comparison signal scp1. The non-inverting input terminal of the second comparator cmp2 receives the detection signal VD. An inverting input terminal of the second comparator cmp2 receives the second reference voltage level Vth2 (e.g., −30 mV, but the invention is not limited thereto) and generates a second comparison signal scp2. A setting terminal S of the SR flip-flop 462_1 is coupled to the first comparator cmp1 to receive the first comparison signal scp1, a reset terminal R of the SR flip-flop 462_1 is coupled to the second comparator cmp2 to receive the second comparison signal scp2, and a non-inverting output terminal Q of the SR flip-flop 462_1 outputs the second signal VSR. In the present embodiment, the time interval of the second signal VSR being in a logic high level may be considered as the time interval Tsr of the capacitor Co being charged by the energy stored in the transformer T, or a time interval Tsr of the SR transistor Msr or the parasitic diode Dr being turned on.

A control terminal of the discharge switch sw1 is coupled to an inverting output terminal/Q of the SR flip-flop 462_1 to receive an inverted second signal/VSR, a second terminal of the discharge switch sw1 is coupled to the first ground terminal GND1. A first terminal of the current source Ic is coupled to the power voltage VDD, and a second terminal of the current source Ic is coupled to a first terminal of the discharge switch sw1. A first terminal of the capacitor Cc is coupled to the second terminal of the current source Ic to generate the first signal Vc, and a second terminal of the capacitor Cc is coupled to the first ground terminal GND1. Therein, the first threshold time Tref may be considered as a duration in which the current source Ic charges the capacitor Cc to rise a voltage level of the first signal Vc up to the first threshold Vref.

In the embodiment illustrated in FIG. 3, the timing circuit 462 uses the current source Ic and the discharge switch sw1 controlled by the inverted second signal/VSR to discharge and charge the capacitor Cc, so as to obtain the length of the time interval Tsr, but the invention is not limited thereto. In other embodiments of the invention, a counter may also be used to count a duration in which the second signal VSR is in a logic high level, so as to obtain the length of the time interval Tsr.

On the other hand, as described above, the PWM signal generator 210 may generate and adjust pulse width modulation signal PWM according to the status of the load RL (or the power supplying requirement). For example, when the load RL is in the light load status, such that the power supplying requirement is lowered down, a frequency of the energy conversion of the power conversion apparatus 200 may be lower. In this case, the PWM signal generator 210 may adjust the pulse width modulation signal PWM to prolong the duration of the power switch Mp being off, such that the frequency of the pulse width modulation signal PWM may be lower. Thereby, a cycle time Tcyc (e.g., the time interval from the time T4 to the time T8 or the time interval from the time T5 to the time T9 in FIG. 2, which depends on design requirement) of the detection signal VD may be increased accordingly, and vice versa.

Thus, in an embodiment of the invention, the SR control circuit 260 may also calculate the cycle time Tcyc of the detection signal VD and determine the status (e.g., the light load or the moderate or heavy load) of the load RL according to a length of the cycle time Tcyc, so as to generate the control signal VG.

Figure 4:
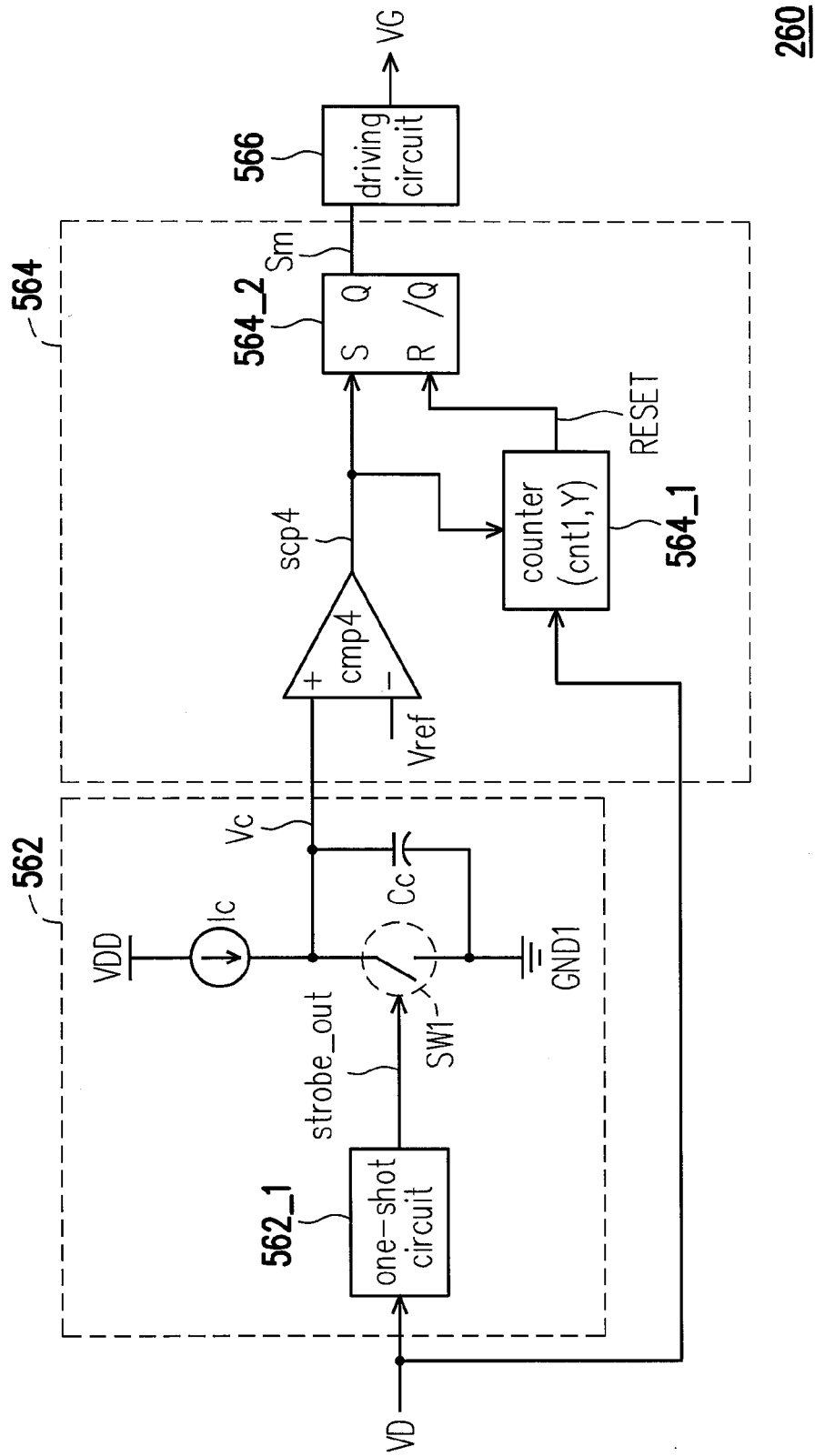
FIG. 4 is a schematic circuit diagram illustrating the SR control circuit of the power conversion apparatus depicted in FIG. 1 according to another embodiment of the invention.
Figure 5:
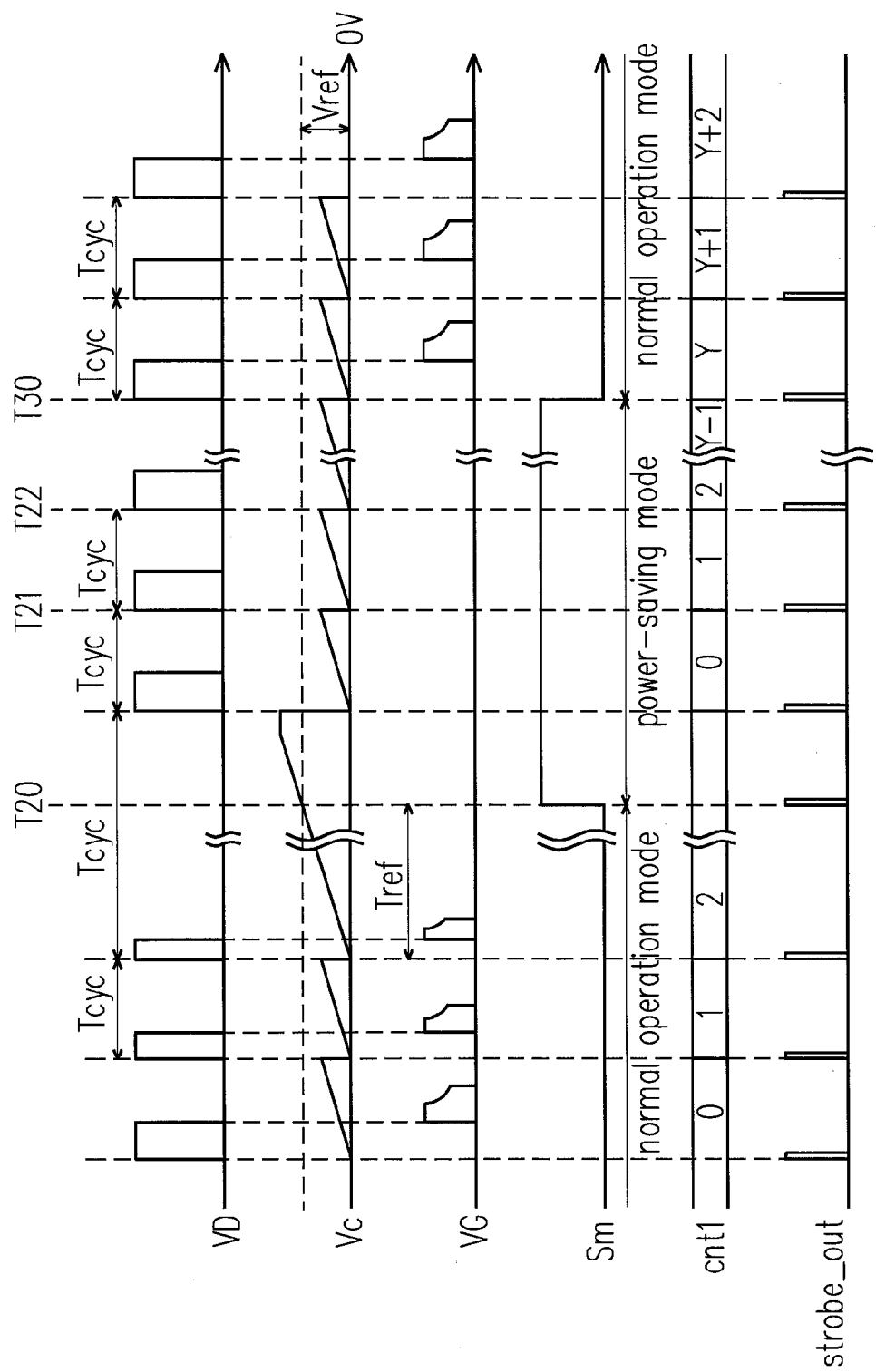
FIG. 5 is a signal timing diagram of the power conversion apparatus depicted in FIG. 1 and the SR control circuit depicted in FIG. 4.

Referring to FIG. 1, FIG. 4 and FIG. 5 simultaneously hereinafter, FIG. 4 is a schematic circuit diagram illustrating the SR control circuit 260 of the power conversion apparatus 200 depicted in FIG. 1 according to another embodiment of the invention. FIG. 5 is a signal timing diagram of the power conversion apparatus 200 depicted in FIG. 1 and the SR control circuit 260 depicted in FIG. 4. Therein, for reading convenience, waveforms with respect to the detection signal VD which are lower than 0V and in the resonance are omitted from FIG. 5.

In the present embodiment, the SR control circuit 260 includes a timing circuit 562, a decision circuit 564 and a driving circuit 566. The timing circuit 562 receives the detection signal VD to calculate the cycle time Tcyc and generates the first signal Vc related to the cycle time Tcyc.

The decision circuit 564 is coupled to the timing circuit 562 to receive the first signal Vc. The decision circuit 564 determines whether the first signal Vc is greater than the first threshold Vref. If the determination result is yes, (e.g., as presented at a time T20 in FIG. 5), the decision circuit 564 determines that the load RL is in the light load state and generates the mode signal Sm, such that the SR control circuit 260 is operated in the power-saving mode. The driving circuit 566 is coupled to the decision circuit 564 to receive the mode signal Sm. When the mode signal Sm indicates that the SR control circuit 260 is operated in the power-saving mode, the driving circuit 566 generates the control signal VG to turn off the SR transistor Msr.

On the other hand, when determining that the first signal Vc is less than or equal to the first threshold Vref (e.g., as presented at times T21, T22, T30 in FIG. 5), the decision circuit 564 accumulates the first count cnt1 or else resets the first count cnt1. When the first count cnt1 is greater than or equal to the first preset value Y (e.g., as presented after the time T30 in FIG. 5), i.e., Y or more consecutive cycle times Tcyc are less than or equal to the first threshold time Tref, the decision circuit 564 may determine that the load RL is in the moderate or heavy load and generate the mode signal Sm, such that the SR control circuit 260 is operated in the normal operation mode. Therein, the first threshold time Tref is related to the first threshold Vref.

Being similar to the driving circuit 466 of the SR control circuit 260 illustrated in FIG. 3, the driving circuit 566 in FIG. 4 receives the detection signal VD. When the mode signal Sm indicates that the SR control circuit 260 is operated in the normal operation mode (e.g., as presented before the time T20 and after the time T30 in FIG. 5), the driving circuit 566 turns on the SR transistor Msr as the voltage level of the detection signal VD is smaller than the first reference voltage level Vth1 (e.g., −200 mV, but the invention is not limited thereto) and turns off the SR transistor Msr as the voltage level of the detection signal VD is greater than the second reference voltage level Vth2 (e.g., −30 mV, but the invention is not limited thereto). Details related to the turning on and off of the SR transistor Msr may refer to the descriptions related to FIG. 1 through FIG. 3 and will not be repeatedly described hereinafter.

In addition, during the duration from the time T20 to the time T30 in FIG. 5, the SR control circuit 260 is operated in the power-saving mode. In this case, the voltage level of the control signal VG is maintained at 0V, so as to turn off the SR transistor Msr. Moreover, the operations of the power switch Mp and the SR transistor Msr may refer to the descriptions related to FIG. 1 through FIG. 3 and will not be repeated hereinafter.

In an embodiment of the invention, the decision circuit 564 includes a comparator cmp4, a counter 564_1 and an SR flip-flop 564_2. A non-inverting input terminal of the comparator cmp4 is coupled to the timing circuit 562 to receive the first signal Vc, and an inverting input terminal of the comparator cmp4 receives the first threshold Vref. The comparator cmp4 compares the first signal Vc with the first threshold Vref to generate a comparison signal scp4. The counter 564_1 receives the detection signal VD. The counter 564_1 is coupled to the comparator cmp4 to receive the comparison signal scp4. At the end of the cycle time Tcyc of the detection signal VD, if the comparison signal scp4 indicates that the first signal Vc is less than or equal to the first threshold Vref, the counter 564_1 accumulates the first count cnt1 or else resets the first count cnt1. Therein, when the first count cnt1 is greater than or equal to the first preset value Y (where Y is a positive integer), the counter 564_1 generates the reset signal RESET. A setting terminal S of the SR flip-flop 564_2 is coupled to the comparator cmp4 to receive the comparison signal Scp4, a reset terminal R of the SR flip-flop 564_2 is coupled to the counter 564_1 to receive the reset signal RESET, and a non-inverting output terminal Q of the SR flip-flop 564_2 outputs the mode signal Sm.

The implementation of the timing circuit 562 will be described hereinafter. Referring to FIG. 4, the timing circuit 562 includes a one-shot circuit 562_1, a discharge switch sw1, a current source Ic and a capacitor Cc. The one-shot circuit 562_1 receives the detection signal VD and configured to detect an edge (e.g., a rising edge or a falling edge) of the detection signal VD to generate a trigger signal strobe_out. A control terminal of the discharge switch sw1 is coupled to the one-shot circuit 562_1 to receive the trigger signal strobe_out, and a second terminal of the discharge switch sw1 is coupled to the first ground terminal GND1. A first terminal of the current source Ic is coupled to the power voltage VDD, a second terminal of the current source Ic is coupled to a first terminal of the discharge switch sw1. A first terminal of the capacitor Cc is coupled to the second terminal of the current source Ic to generate the first signal Vc, and the second terminal of the capacitor Cc is coupled to the first ground terminal GND1.

In detail, when the one-shot circuit 562_1 detects a raising edge of the detection signal VD, the one-shot circuit 562_1 may generate a trigger signal strobe_out corresponding to the rising edge, such that the discharge switch sw1 is turned on transiently, the first signal Vc is discharged to the level of the first ground terminal GND1, and then, the discharge switch sw1 is turned off. Afterwards, the current source Ic starts to charge the capacitor Cc, until the one-shot circuit 562_1 detects the next rising edge of the detection signal VD. In this way, the voltage level of the first signal Vc may accurately reflect a length of the cycle time Tcyc of the detection signal VD. Therein, the first threshold time Tref may be considered as a duration in which the current source Ic charges the capacitor Cc to rise the voltage level of the first signal Vc up to the first threshold Vref.

In the embodiment of invention illustrated in FIG. 4, the timing circuit 562 uses the one-shot circuit 562_1, the discharge switch sw1, the current source Ic and the capacitor Cc to obtain the cycle time Tcyc of the detection signal VD, but the invention is not limited thereto. In other embodiments of the invention, a counter may also be used to calculate the cycle time Tcyc of the detection signal VD.

To sum up, in the power conversion apparatus provided by the embodiments of the invention, the SR control circuit can detect the time interval of the SR transistor (or the parasitic diode thereof) being turned on or the energy conversion cycle of the power conversion apparatus according to the signal from the first drain/source terminal of the SR transistor, so as to determine the status change of the load. When determining that the load is in the light load status, the SR control circuit can enter the power-saving mode and turn off the SR transistor. Thereby, power consumption caused by the SR control circuit charging/discharging the parasitic capacitor of the SR transistor during the SR transistor being switched between on and off states can be prevented. Besides, in the power-saving mode, the SR control circuit can also turn off the related circuits serving for driving the SR transistor to achieve power saving, such that the power conversion efficiency in the light load status can be improved.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A power conversion apparatus, comprising:
   a transformer, having a primary side and a secondary side, wherein a first terminal of the primary side is configured to receive an input voltage, and a first terminal of the secondary side is configured to provide an output voltage to a load;
   a power switch, having a first terminal coupled to a second terminal of the primary side, a second terminal coupled to a second ground terminal and a control terminal configured to receive a pulse width modulation signal;
   a synchronous rectification (SR) transistor, having a first drain/source terminal coupled to a second terminal of the secondary side, a second drain/source terminal coupled to a first ground terminal and a gate terminal configured to receive a control signal; and
   an SR control circuit, coupled to the SR transistor, receiving a signal from the first drain/source terminal of the SR transistor to serve the signal as a detection signal,
   wherein the SR control circuit determines a status of the load according to the detection signal, so as to generate the control signal,
   when determining that the load is in a light load status, the SR control circuit enters a power-saving mode and the SR transistor is off,
   when the SR control circuit is operated in the power-saving mode, the power switch is on and off in response to the pulse width modulation signal,
   wherein the SR control circuit generates a first signal according to the detection signal, if the first signal is less than or equal to a first threshold, the SR control circuit accumulates a first count or else resets the first count,
   wherein the SR control circuit determines that the load is in the light load status or in a moderate or heavy load status according to the first count.

2. The power conversion apparatus according to claim 1, wherein:
   when determining that the load is in the moderate or heavy load status, the SR control circuit enters a normal operation mode, and the SR transistor is controlled by the control signal and turned on or turned off.

3. The power conversion apparatus according to claim 2, wherein a parasitic diode is between the first drain/source terminal and a body terminal of the SR transistor,
   wherein the SR control circuit calculates a time interval of the detection signal and determines the status of the load according to a length of the time interval, so as to generate the control signal,
   wherein the time interval is a duration of the SR transistor or the parasitic diode being turned on.

4. The power conversion apparatus according to claim 3, wherein the SR control circuit comprises:
   a timing circuit, receiving the detection signal to calculate the time interval and generating the first signal related to the time interval;
   a decision circuit, coupled to the timing circuit to receive the first signal and determining whether the first signal is less than the first threshold, wherein if the determination result is yes, the decision circuit accumulates the first count or else resets the first count, and when the first count is greater than or equal to a first preset value, the decision circuit determines that the load is in the light load status and generates a mode signal, such that the SR control circuit is operated in the power-saving mode; and
   a driving circuit, coupled to the decision circuit to receive the mode signal and generating the control signal to turn off the SR transistor when the mode signal indicates that the SR control circuit is operated in the power-saving mode.

5. The power conversion apparatus according to claim 4, wherein:
   the decision circuit determines whether the first signal is greater than or equal to the first threshold, if the determination result is yes, the decision circuit accumulates a second count or else resets the second count, and when the second count is greater than or equal to a second preset value, the decision circuit determines that the load is in the moderate or heavy load status and generates the mode signal, such that the SR control circuit is operated in the normal operation mode; and
   the driving circuit further receives the detection signal, when the mode signal indicates that the SR control circuit is operated in the normal operation mode, the driving circuit turns on the SR transistor as a voltage level of the detection signal is smaller than a first reference voltage level and turns off the SR transistor as the voltage level of the detection signal is greater than a second reference voltage level.

6. The power conversion apparatus according to claim 5, wherein the decision circuit comprises:
   a decision comparator, having a non-inverting input terminal coupled to the timing circuit to receive the first signal and an inverting input terminal receiving the first threshold, and the decision comparator comparing the first signal with the first threshold and generating a decision signal;
   a counter, coupled to the decision comparator to receive the decision signal and when the decision signal indicates that the first signal is less than the first threshold, accumulating the first count and resetting the second count or else resetting the first count and accumulating the second count, wherein when the first count is greater than or equal to the first preset value, the counter generates a setting signal, and when the second count is greater than or equal to the second preset value, the counter generates a reset signal; and
   an SR flip-flop, having a setting terminal coupled to the counter to receive the setting signal, a reset terminal coupled to the counter to receive the reset signal and a non-inverting output terminal outputting the mode signal.

7. The power conversion apparatus according to claim 6, wherein the timing circuit comprises:
- a first comparator, having an inverting input terminal receiving the detection signal, and a non-inverting input terminal receiving the first reference voltage level to generate a first comparison signal;
- a second comparator, having a non-inverting input terminal receiving the detection signal, and an inverting input terminal receiving the second reference voltage level to generate a second comparison signal;
- an SR flip-flop, having a setting terminal coupled to the first comparator to receive the first comparison signal, a reset terminal coupled to the second comparator to receive the second comparison signal and a non-inverting output terminal outputting a second signal;
- a discharge switch, having a control terminal coupled to an inverting output terminal of the SR flip-flop to receive an inverted second signal and a second terminal coupled to the first ground terminal;
- a current source, having a first terminal coupled to a power voltage and a second terminal coupled to a first terminal of the discharge switch; and
- a capacitor, having a first terminal coupled to a second terminal of the current source to generate the first signal and a second terminal coupled to the first ground terminal.

8. The power conversion apparatus according to claim 2, wherein:
the SR control circuit calculates a cycle time of the detection signal and determines the status of the load according to a length of the cycle time, so as to generate the control signal,
wherein the cycle time is an energy conversion cycle of the power conversion apparatus.

9. The power conversion apparatus according to claim 8, wherein the SR control circuit comprises:
- a timing circuit, receiving the detection signal to calculate the cycle time and generate the first signal related to the cycle time; and
- a decision circuit, coupled to the timing circuit to receive the first signal, determining whether the first signal is greater than the first threshold, if the determination result is yes, the decision circuit determining that the load is in the light load status and generating a mode signal, such that the SR control circuit is operated in the power-saving mode; and
- a driving circuit, coupled to the decision circuit to receive the mode signal, when the mode signal indicates that the SR control circuit is operated in the power-saving mode, the driving circuit generating the control signal to turn off the SR transistor.

10. The power conversion apparatus according to claim 9, wherein:
the decision circuit determines whether the first signal is less than or equal to the first threshold, if the determination result is yes, the decision circuit accumulates the first count or else resets the first count, if the first count is greater than or equal to a first preset value, the decision circuit determines that the load is in the moderate or heavy load status and generates the mode signal, such that the SR control circuit is operated in the normal operation mode; and
the driving circuit further receives the detection signal, when the mode signal indicates that the SR control circuit is operated in the normal operation mode, the driving circuit turns on the SR transistor as a voltage level of the detection signal is smaller than a first reference voltage level and turns off the SR transistor as the voltage level of the detection signal is greater than a second reference voltage level.

11. The power conversion apparatus according to claim 10, wherein the decision circuit comprises:
- a comparator, having a non-inverting input terminal coupled to the timing circuit to receive the first signal and an inverting input terminal receiving the first threshold, and the comparator comparing the first signal with the first threshold to generate a comparison signal;
- a counter, receiving the detection signal, coupled to the comparator to receive the comparison signal, and if the comparison signal indicates that the first signal is less than or equal to the first threshold at the end of the cycle time of the detection signal, the counter accumulating the first count or else resetting the first count, wherein when the first count is greater than or equal to the first preset value, the counter generates a reset signal; and
- an SR flip-flop, having a setting terminal coupled to the comparator to receive the comparison signal, a reset terminal coupled to the counter to receive the reset signal and a non-inverting output terminal outputting the mode signal.

12. The power conversion apparatus according to claim 11, wherein the timing circuit comprises:
- a one-shot circuit, receiving the detection signal and configured to detect an edge of the detection signal to generate a trigger signal;
- a discharge switch, having a control terminal coupled to the one-shot circuit to receive the trigger signal and a second terminal coupled to the first ground terminal;
- a current source, having a first terminal coupled to a power voltage and a second terminal coupled to a first terminal of the discharge switch; and
- a capacitor, having a first terminal coupled to the second terminal of the current source to generate the first signal and a second terminal coupled to the first ground terminal.

13. The power conversion apparatus according to claim 2, further comprising:
a pulse width modulation signal generator, coupled to the control terminal of the power switch and configured to adjust the pulse width modulation signal according to the status of the load,
wherein a parasitic diode is between the first drain/source terminal and a body terminal of the SR transistor,
wherein when the power switch is turned off, and the SR control circuit is operated in the power-saving mode, the SR transistor is controlled by the control signal and turned off, and the parasitic diode is turned on.

14. The power conversion apparatus according to claim 13, wherein:
when the power switch is turned off, and the SR control circuit is operated in the normal operation mode, the SR transistor is controlled by the control signal and turned on.

15. The power conversion apparatus according to claim 14, wherein:
when the power switch is turned on, the SR transistor and the parasitic diode are turned off.

* * * * *